United States Patent Office 3,222,330
Patented Dec. 7, 1965

3,222,330
COPOLYMERS OF ETHYLENE-$CH_2$=CH—$CH_2$—R-HALOGEN-2-NORBORNENES
Jack Leland Nyce, Meadowood, Newark, and Rolland Shih-yuan Ro, Wilmington, Del., assignors to E. I. du Pont de Nemours and Company, Wilmington, Del., a corporation of Delaware
No Drawing. Filed Sept. 7, 1961, Ser. No. 136,449
15 Claims. (Cl. 260—80.5)

This invention is directed to novel copolymers containing side-chain substituted halogen. More particularly, the present invention relates to curable copolymers of ethylene, selected halogenated olefins and, optionally, unsaturated hydrocarbon monomers.

Synthetic hydrocarbon thermoplastics and elastomers are becoming more and more commercially important today. Unfortunately they need better oil and flame resistance for some applications.

It is an object of the present invention to provide new copolymers. It is a further object to provide new copolymers displaying improved oil and flame resistance. It is a still further object to provide new curable elastomers prepared from hydrocarbon monomers and halogenated olefins. It is a yet still further object to provide processes for preparing and curing these copolymers.

These and other objects will become apparent in the following description and claims.

More specifically, the present invention is directed to normally solid copolymers containing at least 2% by weight of a side-chain substituted halogen, said copolymers consisting of monomer units of (1) ethylene; (2) at least one halogenated olefin, said olefin being selected from the class consisting of: (a) compounds having the structure $CH_2$=CH—$CH_2$—R where R is a monovalent aliphatic hydrocarbon radical substituted by at least one halogen atom, and (b) 2-norbornenes having one unsubstituted carbon-carbon double bond; and, optionally, (3) at least one unsaturated hydrocarbon monomer, other than ethylene, capable of being polymerized with a coordination catalyst.

The novel copolymers of the present invention can be prepared by contacting ethylene, at least one halogenated olefin of the heretofore discribed structure and, optionally, one or more unsaturated hydrocarbon monomers, as described, in solution, in specific inert solvents with specific coordination catalysts, as hereinafter described, at temperatures between about −10° C. and 25° C. at atmospheric, subatmospheric, or superatmospheric pressure. Those containing chlorine, bromine or iodine can also be made by adding halogen to side chain C=C groups of ethylene/non-conjugated hydrocarbon diene copolymers.

The copolymers thus obtained are of sufficiently high molecular weight to be solid at normal temperatures. They may be thermoplastics or elastomers depending on the monomers and the proportions of monomers used in their preparation. Many of the copolymers of the present invention are self-extinguishing and display excellent resistance to oils and ultra-violet radiation. They are generally capable of being milled and formed into shaped articles, such as films. They are generally capable of being cured, i.e., vulcanized with peroxides and also with the curing systems employed customarily to vulcanize other halogenated polymers such as "Neoprene" and "Viton" synthetic rubber. Specific copolymers, which employ non-conjugated dienes in their preparation, are capable of being cured with the sulfur vulcanization systems used in the rubber industry.

One class of halogenated olefins which may be utilized in the practice of this invention has the general structure $CH_2$=CH—$CH_2$—R where R is a monovalent aliphatic hydrocarbon radical substituted by at least one atom of F, Cl, Br, or I. The halogen, X, can be present in groups such as —$CH_2X$, —$CHX_2$, —$CX_3$

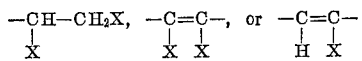

Preferred members of this class have the structures $$CH_2=CH—CH_2—(CH_2)_nX$$

and $$CH_2=CH—(CH_2)_n—CHX—CHX—R$$

where $n$=1–12 and R is a hydrocarbon group. Representative members include: 4-chloro-1-butene; 4-bromo-1-butene; 5-chloro-1-pentene; 5-bromo-1-pentene, which is one of the particularly preferred halogenated olefins; 6-fluoro-1-hexene; 7-bromo-1-heptene; 9-bromo-1-nonene; 11-chloro-1-hendecene; 11-bromo-1-hendecene; 11-iodo-1-hendecene; 13-bromo-1-tridecene; and 15-bromo-1-pentadecene. Other useful halogenated olefins include: 13-bromo-12-methyl-1-tridecene; 4-chloro-1-pentene; 4-chloro-1-hexene; 5-chloro-1-hexene; 5-bromo-1-hexene; 5-iodo-1-hexene; 6-bromo-5-bromomethyl-1-heptene. Still other halogenated olefins include: 5,5,5-trichloro-1-pentene; 4,5-dibromo-1-hexene; 5,6-dibromo-1-hexene another preferred compound; and 4,4,5,5-tetrabromo-1-hexene. Useful halogen-bearing 2-norbornenes include: 5,6-bischloromethyl-2-norbornene; 5-trichloromethyl-2-norbornene; and

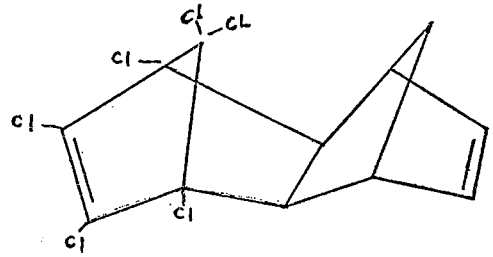

Unsaturated hydrocarbon monomers, other than ethylene, capable of being polymerized or copolymerized with a coordination catalyst which can be used in making the copolymers of the present invention include, as representative types: (a) α-monoolefins having the structure R—CH=$CH_2$, where R is an alkyl radical having, preferably, not more than 8 carbon atoms; (b) non-conjugated hydrocarbon dienes. Representative dienes include: dicyclopentadiene; aliphatic dienes having the structure

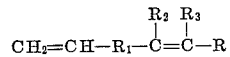

wherein $R_1$ is an alkylene radical, $R_2$ and $R_3$ are independently selected from the group consisting of hydrogen and alkyl radicals and $R_4$ is an alkyl radical and wherein $R_1$ to $R_4$ are so selected that the diene has from about 6 to 22 carbon atoms; a 5-alkenyl-substituted-2-norbornene; 5-methylene-2-norbornene, and 2-alkyl-2,5-norbornadiene. Representative examples of useful α-olefins having the structure R—CH=$CH_2$ include propylene; 1-butene; 4-methyl-1-pentene; 1-pentene; 1-hexene; 1-heptene; 1-octene; 1-nonene; 1-decene; 5-methyl-1-nonene; 5,5-dimethyl-1-octene; 4-methyl-1-hexene; 4,4-dimethyl-1-pentene; 5-methyl-1-hexene; 4-methyl-1-heptene; 5-methyl-1-heptene; 6-methyl-1-heptene; 4,4-dimethyl-1-hexene; 5,6,6-trimethyl-1-heptene; 1-dodecene; 1-octadecene.

Representative examples of aliphatic dienes, having the structure

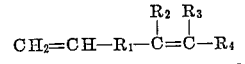

wherein the R's are as defined heretofore, include 1,4-hexadiene, which is preferred; 1,9-octadecadiene; 6- methyl-1,5-heptadiene; 7-methyl-1,6-octadiene; 11-ethyl-1,11-tridecadiene; 9-ethyl-1,9-undecadiene; 7-ethyl-1,7-nonadiene; 8-propyl-1,8-undecadiene; 8-ethyl-1,8-decadiene; 10-ethyl-1,9-dodecadiene; 12-ethyl-1,12-tetradecadiene; 13-n-butyl-1,12-heptadecadiene; and 15-ethyl-1,15-heptadecadiene. Dienes such as 11-ethyl-1,11-tridecadiene are made by reacting an alkyl Grignard reagent with the alkyl ester of an ω-unsaturated carboxylic acid and dehydrating the tertiary alcohol thereby produced.

The diene 5-methylene-2-norbornene has the structure:

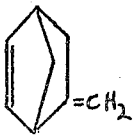

To obtain 5-methylene-2-norbornene, allene having the formula $H_2C=C=CH_2$ is heated in the absence of a polymeriaztion initiator with cyclopentadiene. Preferably the reaction is carried out at a temperature of 175–225° C. and still more preferably above 200° C. and in the presence of an addition polymerization inhibitor. The broad temperature operating range is generally between about 150° and 250° C. The pressure under which this reaction is carried out is not critical. Good results are obtained when the reactants are heated in a closed container under the autogenous pressure developed by the reactants under the operating conditions. The reaction vessel can be constructed of any material which is inert to the reactants and is capable of withstanding the operating pressures. Reaction vessels made of glass, stainless steel and glass-lined steel are quite satisfactory. The reaction time can be varied widely. Times ranging from 2–24 hours or more at 150° C. to 250° C. are operable. Very good results are obtained in reaction periods ranging from 4 to 16 hours. Reactants which are commercially available in the grades used for polymeriaztion are satisfactory for use in making 5-methylene-2-norbornene. However, best results are obtained when the allene is relatively pure.

The 5-alkenyl-2-norbornenes may be described by the following formula

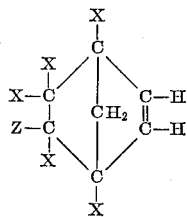

wherein each X represents hydrogen or a monovalent alkyl radical of from 1 to 6 carbon atoms; Z represents a monovalent alkenyl radical, the carbon-to-carbon double bond therein being internal.

A wide variety of 5-alkenyl-2-norbornenes can be made for use in the present invention by the Diels-Alder addition of both conjugated and non-conjugated hydrocarbon dienes to cyclopentadienes having the formula

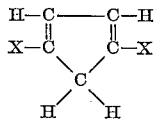

in which X is as heretofore described; the X's can be the same or different. The reaction is carried out at autogenous pressure in a closed inert (e.g. glass and stainless steel) container at temperatures ranging between about 150 to 250° C., preferably 175–225° C., for times ranging between about 2 to 24 hours. It is preferred that an addition polymeriaztion inhibitor (e.g. hydroquinone) be present. Rrepresentative syntheses of this type are: the formation of 5-(2'-butenyl)-2-norbornene from cyclopentadine and 1,4-hexadiene; the preparation of 5-(1'-propenyl)-2-norbornene for cyclopentadiene and 1,3-pentadiene (often called piperylene).

The reaction of cyclopentadiene with conjugated dienes having the structure X'—CH=CH—CH=CH—X'', where X' and X'' are alkyl radicals, can be used to prepare 6-alkyl-5-alkenyl-2-norbornenes having the structures

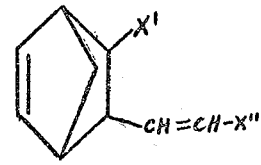

and

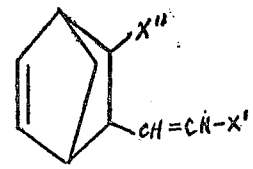

The reaction of cyclopentadiene with conjugated dienes of the formula $CH_2=CH$—$CH=CH$—Q', where Q' is an alkyl radical, will produce

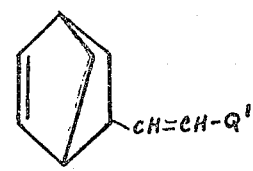

The reaction of cyclopentadiene with unsymmetrical non-conjugated dienes of the structure $$CH_2=CH-CH_2-CH=CH-Q$$

where Q is an alkayl radical will lead to 5-(2-alkenyl)-2-norbornenes

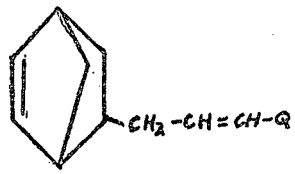

The 2-norbornenes having the structures

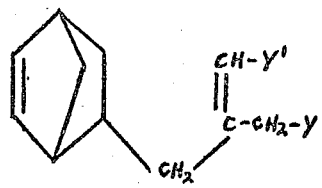

and

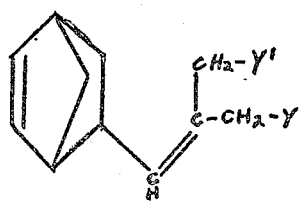

where Y is H or alkyl and Y' is alkyl, are made by reacting the Grignard reagent of 5-bromomethyl-2-norbornene in ether with ketones having the structure

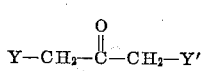

and dehydrating the resulting tertiary carbinol in refluxing toluene in the presence of anhydrous copper sulfate.

The preparation of 5-(2'-ethyl-2'-butenyl)-2-norbornene from diethyl ketone is typical.

Representative examples of the heretofore described 2-norbornenes include:

5-(2'-ethyl-2'-butenyl)-2-norbornene;
5-(2'-ethyl-1'-butenyl)-2-norbornene;
5-(2'-methyl-1'-propenyl)-2-norbornene;
5-(2'-propyl-2'-pentenyl)-2-norbornene;
5-(2'-hexyl-2'-undecenyl)-2-norbornene;
5-(2'-nonyl-2'-heptenyl)-2-norbornene;
5-(2'-butyl-1'-pentenyl)-2-norbornene;
5-(2'-pentyl-1'-octenyl)-2-norbornene;
5-(2'-heptyl-1'-undecenyl)-2-norbornene;
5-(2'-methyl-2'-butenyl)-2-norbornene;
5-(2'-methyl-2'-decenyl)-2-norbornene;
5-(2'-methyl-1'-butenyl)-2-norbornene;
5-(2'-methyl-1'-hexenyl)-2-norbornene;
5-(2'-methyl-1'-undecenyl)-2-norbornene;
5-(2'-hexyl-2'-butenyl)-2-norbornene
5-(2'-octyl-2'-butenyl)-2-norbornene;
5-(2'-ethyl-2'-decenyl)-2-norbornene; and
5-(2'-ethyl-1'-octenyl)-2-norbornene.

The 2-alkyl-2,5-norbornadienes can be described by the following structural formula

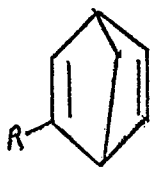

or

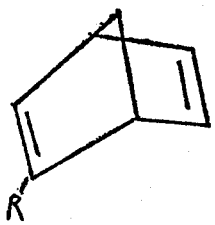

where R is a $C_1$–$C_{17}$ alkyl radical. These dienes are made by heating acetylenes having the formula R—C≡C—H, where R is a $C_1$–$C_{17}$ alkyl radical, with cyclopentadiene at 175–225° C. in the absence of a polymerization initiator. Closed reaction vessels made from stainless steel or glass-lined steel are satisfactory.

Representative examples include: 2-methylnorbornadiene; 2-ethylnorbornadiene; 2-propylnorbornadiene; 2-isopropylnorbornadiene; 2-n-butylnorbornadiene; 2-isobutylnorbornadiene; 2-tert-butylnorbornadiene; 2-n-amylnorbornadiene; 2-(3-methylbutyl)norbornadiene; 2-neopentylnorbornadiene; 2-n-hexylnorbornadiene; 2-n-octylnorbornadiene; 2-n-nonylnorbornadiene; 2-n-dodecylnorbornadiene; and 2-n-heptadecylnorbornadiene.

Representative examples of the copolymers of the present invention include:

Ethylene/5-bromo-1-pentene
Ethylene/propylene/5-bromo-1-pentene
Ethylene/1-butene/6-fluoro-1-hexene
Ethylene/1,4-hexadiene/5-bromo-1-pentene
Ethylene/4-chloro-1-butene
Ethylene/11-chloro-1-hendecene
Ethylene/11-iodo-1-hendecene
Ethylene/15-bromo-1-pentadecene
Ethylene/6-methyl-1-heptene/5,6-dibromo-1-hexene
Ethylene/15-ethyl-1,15-heptadecadiene/4-bromo-1-butene
Ethylene/propylene/4-chloro-1-pentene
Ethylene/5-methylene-2-norbornene/5-iodo-1-hexene
Ethylene/dicyclopentadiene/5,6-dibromo-1-hexene
Ethylene/4,4,5,5-tetrabromo-1-hexene
Ethylene/1-octadecene/6-bromo-5-bromomethyl-1-heptene
Ethylene/13-bromo-12-methyl-1-tridecene
Ethylene/5-(1'-propenyl)-2-norbornene/9-bromo-1-nonene
Ethylene/5-(2'-butenyl)-2-norbornene/5-chloro-1-pentene
Ethylene/propylene/5-(2'-ethyl-2'-butenyl)-2-norbornene/4-chloro-1-butene
Ethylene/2-ethyl-norbornadiene/5-bromo-1-pentene
Ethylene/13-bromo-1-tridecene
Ethylene/5,5,5-trichloro-1-pentene
Ethylene/5,6-dichloromethyl-2-norbornene
Ethylene/4,5-dibromo-1-hexene
Ethylene/5,6-dibromo-1-hexene When desiring a sulphur curable copolymer, one incorporates enough of any of the heretofore described non-conjugated dienes to provide at least about 0.03 gram-mole per 100 grams of copolymer. The maximum amount present by weight when an elastomer is desired, should not exceed about 20% by weight. As another indication of adequate sulphur curability, the iodine number of the novel copolymers should be at least five. The iodine number is a measure of the unsaturation of the copolymer and this unsaturation arises from two sources (1) the second carbon-carbon double bond of the non-conjugated diene and (2) the terminal groups of the polymer chain, which based on infrared evidence, have a double bond of the vinylidene type:

$$C=\overset{\overset{C}{|}}{C}-$$

Iodine numbers in excess of about 60 are generally undesirable because that much unsaturation is not needed for curability.

As noted heretofore, the novel copolymers of this invention are prepared at −10° C. to 25° C. in solutions in specific inert solvents with specific coordination catalysts. Oxygen, water vapor, and carbon dioxide are carefully excluded. A very useful catalyst is prepared by mixing vanadium tris(acetylacetonate) with diisobutyl aluminum chloride in methylene chloride. The relative proportions of the vanadium salt and the organo aluminum compound may be varied so that the value of the molar ratio of aluminum to vanadium ranges between about 6:1 to 9:1 or higher. A molar ratio of 9 to 1 is generally preferred. Alternatives to methylene chloride include ethyl chloride, 1,2-dichloroethane, carbon tetrachloride, and saturated hydrocarbons such as n-heptane. Other coordination catalysts may be used. A representative example is made by mixing vanadium oxytrichloride with triisobutyl aluminum in carbon tetrachloride. Another example is prepared by mixing vanadium tris(acetylacetonate) and vanadium oxytrichloride with triisobutylaluminum in carbon tetrachloride.

Still another representative useful catalyst is made by mixing titanium tetrachloride with triisobutylaluminum in cyclohexane. The preferred concentration of the vanadium or titanium salt in the copolymerization reaction zone is about 0.0005 to about 0.005 mole/liter; however, higher or lower concentrations can be employed. Generally the catalyst is premixed in the presence of the monomers of low volatility (relative to ethylene) such as the halogen-bearing olefins or the non-conjugated dienes. The catalyst should not be formed in the presence of ethylene alone; otherwise undesired polyethylene will be formed on account of the great reactivity of this monomer. The catalyst can be formed in the absence of any monomers or it can be made in situ in the copolymerization zone.

In making the copolymers of the present invention it is essential that ethylene and at least one of the halogen-bearing monomers be present all the time during the copolymerization reaction. Frequently, all the monomers being incorporated are present all the time. Part or all of the monomers, which are liquid at the operating pressure, can be present before the reaction is started. Monomers can be introduced continuously or intermittently. Because ethylene reacts so much faster than the other monomers, a large excess of the latter is usually continually maintained.

During the reaction agitation is usually maintained. Cooling is applied when desired. Since the charge becomes increasingly viscous as the copolymerization proceeds, it is generally convenient to stop the reaction before the copolymer concentration exceeds about 10% by weight. This may require about 15 minutes to 3 hours when the reaction temperature ranges between about −10° C. to 25° C.

The catalyst is deactivated by introduction of a low molecular weight alcohol such as isopropanol and n-butanol into the reaction mass. The copolymer is then isolated by diluting the reaction mass with about an equal volume of isopropanol or acetone and collecting the precipitated copolymer by conventional filtration. Residual solvent is removed by drying the copolymer on a rubber roll mill or in a vacuum oven. An antioxidant, such as 4,4'thiobis(2-tert-butyl-5-methylphenol) is often incorporated prior to the drying operation to avoid possible oxidation and degradation of the copolymer.

The copolymers of the present invention can be prepared by a continuous process. Thus, solvent, monomers and catalyst may be introduced continuously into a polymerization zone at such a rate as to provide a residence time sufficient to build up the desired concentration of copolymer in the polymerization mass. The residence time may vary widely, from say, 10 minutes to several hours or more. In general, the residence time will be shorter as the concentrations of monomers and catalysts in the feed stream are increased. The copolymer solution which continually overflows from the polymerization zone is contacted in a subsequent zone with a catalyst deactivator; the copolymer is ultimately continually obtained after suitable continuous purification and isolation procedures.

The copolymers of the present invention containing bromine, chlorine, or iodine can also be made by adding halogen or a hydrogen halide to the side chain C=C groups of ethylene/non-conjugated hydrocarbon diene copolymers which, in turn, can be made using the hydrocarbon dienes and the polymerization procedures heretofore described. Representative hydrocarbon copolymers are described in U.S. Patent 2,933,480. The halogenation and hydrohalogenation procedures familiar to those skilled in the olefin art can be used. Representative procedures which are applicable here are given in Synthetic Organic Chemistry, R. B. Wagner and H. D. Zook, John Wiley & Sons, Inc., New York, 1953, pages 106–108. It is not always necessary to isolate the hydrocarbon copolymer before adding the halogen. For example, after a copolymer has been made in solution and the catalyst deactivated with alcohol, one can add bromine at 0° C. in any proportion up to a slight molar excess (as indicated by the persistent bromine color) and thereafter isolate the copolymer by conventional means.

The novel coplymers of this invention may be cured by any of a wide variety of curing procedures.

When the copolymer contains ethylenic unsaturation in its side chain, it may be readily cured with sulphur; any of the procedures familiar to those skilled in the processing of natural rubber, butadiene-styrene rubber (SBR) and butyl rubber are suitable. Various procedures and modifications of surfur curing are described in Encyclopedia of Chemical Technology, Kirk and Othmer, published by Interscience Encyclopedia, Inc., New York, 1953, vol. 11, pages 892–927; Principles of High-Polymer Theory and Practice, Schmidt and Marlies, published by McGraw-Hill Book Co., Inc., New York, 1948, pages 556–566; and Chemistry and Technology of Rubber, Davis and Blake, published by Reinhold Publishing Corporation, New York, 1937, Chapter VI.

In place of sulfur curing, a free radical cure may be employed. In carrying out a free radical cure of these copolymers, it is merely necessary to mix, by standard procedures, a free radical generator with the copolymer and to heat until a cure is obtained. The temperature range may vary within wide limits, depending upon the particular free radical generator being used. However, heating to temperatures of about 50°–175° C. for a period of 30 minutes to several hours is ordinarily adequate. Longer times may be used in the case of the more thermally stable free radical generators.

The preferred free radical generators which may be incorporated with the copolymers are organic peroxides. Representative examples are bis(alpha,alphadimethylbenzyl) peroxide, dibenzoyl peroxide, di-tert-butyl peroxide, cumene hydroperozide, methyl ethyl ketone peroxide, tert-butyl perbenzoate and di-N-methyl tert-butyl percarbamate. Bis(alpha,alpha-dimethylbenzyl) peroxide )often called dicumyl peroxide) and 2,5-bis(tert-butylperoxy)-2,5-dimethyl hexane are particularly preferred. About 2.5 to 3 parts by weight is used for every 100 parts by weight of the copolymer. The compounded stock is then cured at about 150° C. for about 30 to 60 minutes.

In addition to the free radical generator, a free radical acceptor may be present such as N-substituted maleimide, and N,N'-substituted bismaleimide, and N,N'-substituted bisacrylamide, a cyclic triacryloylhexahydrotriazine, or mixtures thereof. The quantity of free radical acceptor may range from about 0.5% to 6% by weight of the copolymer. The weight of the free radical acceptor may be less, equal to, or more than the weight of the free radical generator. The use of these acceptors is more particularly described in U.S. Patent 2,958,672.

Metal oxide based curing systems familiar to those skilled in the neoprene art are also suitable. The most common reagents are magnesium oxide and zinc oxide which are often used in combination. Further details are given in Introduction to Rubber Technology, Ed. by M. Morton, Reinhold Publishing Corp., New York, New York, 1959, pages 340–348; The Neoprenes, N. L. Catton, Rubber Chemicals Division, E. I. du Pont de Nemours and Co., Inc., Wilmington, Delaware, 1953.

A wide variety of compounding agents may be incorporated with these copolymers at the time they are cured in order to improve various properties. Thus, they may be loaded with carbon black in order to increase the tensile strength. Other compounding agents include titanium dioxide and silica.

The copolymers of this invention have many varied uses. They may be employed in the preparation of tires, inner tubes, belts, hose and tubing, wire and cable jackets, footware, sponges, coated fabrics and a variety of coated or molded articles. As mentioned heretofore, they are characterized as self-extinguishing and exhibit excellent resistance to oils, heat, and light.

Representative examples illustrating the present invention follow.

PREPARATION OF VANADIUM
TRIS(ACETYLACETONATE)

Three grams of $VCl_3$ were dissolved in 10 milliliters of dilute sulfuric acid. The resulting solution was added to 20 milliliters of acetylacetone in an Erlenmeyer flask. When this mixture was shaken, a reaction occurred and heat was evolved. Five minutes later the resulting dark brown solution was neutralized with aqueous sodium carbonate. The brown crystals which then precipitated were collected by filtration, washed with water and air-dried. Seven grams of vandium tris(acetylacetonate)

were obtained melting at 195–196° C. (after recrystallization from benzene and petroleum ether).

*Anal.*—Calc'd for $VC_{15}H_{21}O_6$: 14.4% V. Found: 14.6, 14.5% V.

Example 1

PREPARATION OF ETHYLENE/PROPYLENE/5-BROMO-1-PENTENE COPOLYMER

The reactor was a 500-milliliter glass resin flask equipped with a stirrer, a thermometer, a gas inlet tube, a gas outlet tube, and a liquid inlet tube covered with a rubber (serum) cap. This apparatus was flame dried and allowed to cool under a stream of purified nitrogen which was maintained during subsequent operations until monomer gases were introduced. Methylene chloride (100 milliliters) was filtered through a column of silica gel directly into the reaction flask and rapidly stirred while sparged with purified nitrogen for about 30 minutes. Then 5-bromo-1-pentene (25 milliliters) and vanadium tris(acetylacetonate) (0.17 gram, 0.00049 mole) were introduced. After the agitated mixture had been cooled to 0° C., diisobutyl aluminum chloride (0.585 gram, 0.0033 mole) was introduced.

Immediately thereafter, the nitrogen feed was stopped and a feed stream supplying ethylene and propylene at respective rates of 700 and 2,100 cc./minute was introduced into the agitated catalyst solution by means of the gas inlet tube which projected below the liquid surface. The ethylene and propylene had been separately supplied to flow-meters connected to separate purification trains where they passed successively through a column of silica gel, three columns each containing 20% solutions of the aluminum triisobutyl in "Nujol" oil a liquid petrolatum of specific gravity 0.88/0.90 at 60° F., a column of "Nujol" oil, and a final silica gel column leading to a T-tube joining the streams. The nitrogen had been purified by passage through a similar train.

Gas absorption was observed. After 15 minutes, the reaction mixture had become very viscous. The polymerization was stopped by addition of isopropanol (10 milliliters) containing 0.1% by weight 4,4'-thiobis (2-tert-butyl-5-methylphenol). The monomer feed streams were then shut off. The product, precipitated thereafter by addition of isopropanol (200 milliliters), was collected by filtration, washed in a Waring Blendor with acetone and air dried. A soft elastomeric ethylene/propylene/5-bromo-1-pentene copolymer was obtained weighing 12 grams and exhibiting an inherent viscosity of 0.57. It analyzed for 19.9% by weight bromine indicating incorporation of 37.2% by weight 5-bromo-1-pentene monomer units.

After the copolymer had been compounded according to the following recipe (parts by weight): Copolymer, 100; SAF black, 50; MgO, 2; ZnO, 5; 0.2; dicumyl peroxide (40% active ingredient), 10, it was heated for 45 minutes at 153° C. in a 1 x 5" mold. The vulcanizate properties at 25° C. were as follows: $M_{200}$, 650 (p.s.i.); $T_B$, 1000 (p.s.i.); $E_B$, 300%.

Example 2

PREPARATION OF ETHYLENE/5-BROMO-1-PENTENE COPOLYMER

The general procedure described in preceding Example 1 was repeated except as noted hereinafter.

To a solution of 5-bromo-1-pentene (25 milliliters, 0.25 mole) and vanadium tris(acetylacetonate) (0.17 gram, 0.00049 mole) in methylene chloride (100 milliliters) at 0° C. was added diisobutyl aluminum chloride (0.0585 gram, 0.0033 mole). Thereafter a feed stream supplying ethylene at the rate of 0.7 liter/minute was introduced. An insoluble copolymer was formed. After 15 minutes, isopropanol (10 milliliters) was added to deactivate the catalyst and stop the polymerization. The product coagulated thereafter by addition of isopropanol (200 milliliters), was collected by conventional filtration. The ethylene/5-bromo-1-pentene copolymer was obtained as a flame resistant elastomeric solid weighing 12 grams and displaying an inherent viscosity of 0.59. It analyzed for 23.7% by weight bromine indicating incorporation of 44.1% 5-bromo-1-pentene monomer units by weight (12.9 mole percent).

This copolymer could be pressed into clear elastic films. The films were self-extinguishing, that is, when ignited by being contacted with a flame they burned with difficulty and as soon as the flame was removed they ceased burning.

A sample of the clear, elastic film was exposed to ultraviolet light in a Fade-O-Meter. After 100 hours exposure the film was only very faintly yellowed. By hand test, its physical properties were not impaired. Its original flexibility and extensibility were retained. There was no perceptible damage to the film surface.

Example 3

PREPARATION OF ETHYLENE/5-BROMO-1-PENTENE COPOLYMER

The general procedure and equipment of Example 1 were employed except as described hereinafter. The catalyst was formed by adding diisobutyl aluminum chloride (0.54 gram, 0.00305 mole) to a solution of 5-bromo-1-pentene (20 milliliters) and vanadium tris(acetylacetonate) (0.07 gram, 0.0002 mole) in methylene chloride (180 milliliters) under a nitrogen atmosphere at 15° C. Thereafter a feed stream was introduced supplying ethylene at the rate of 0.5 liter/minute. The orange-red color of the catalyst rapidly faded to a very light brown. As the polymerization proceeded a pasty mixture was obtained. At the end of 15 minutes, isopropanol (10 milliliters) was added to deactivate the catalyst. The product, precipitated by addition of more isopropanol (360 milliliters), was collected by conventional filtration, washed with acetone in a Waring Blendor, and air dried. The elastomeric ethylene/5-bromo-1-pentene copolymer weighed 9.4 grams, exhibited an inherent viscosity of 0.60, and contained 21.3% by weight bromine corresponding to 39.6% by weight (10.9 mole percent) 5-bromo-1-pentene monomer units. The copolymer was self-extinguishing when touched with a flame.

Example 4

PREPARATION OF ETHYLENE/5-BROMO-1-PENTENE COPOLYMER

The general procedure and equipment described in Example 1 were used except as noted.

Diisobutyl aluminum chloride (0.36 gram, 0.00204 mole) was added to a solution of 5-bromo-1-pentene (50 milliliters) and vanadium tris(acetylacetonate) (0.11 gram, 0.000316 mole) in methylene chloride (100 milliliters) at 0° C. under a nitrogen atmosphere. Thereafter a feed stream supplying ethylene (0.5 liter/minute) and nitrogen (0.5 liter/min.) was introduced above the surface of the reaction mixture.

As the polymerization proceeded, the reaction mixture steadily became more viscous. After the ethylene had been introduced into the agitated reaction mixture over a period of 2 hours at 0° C., the polymerization was stopped by addition of 10 milliliters of isopropanol. The ethylene feed stream was shut off and 200 milliliters of isopropanol were added to precipitate the copolymer product. After the precipitate had been collected by conventional filtration, washed in a Waring Blendor with acetone, and air dried, 20 grams of an ethylene/5-bromo-1-pentene copolymer were obtained exhibiting an inherent viscosity of 0.70 and containing 33.6% bromine by weight corresponding to 63.6 weight percent 5-bromo-1-pentene monomer units.

(a) A portion of the copolymer product was compounds on a rubber roll mill according to a standard neoprene cure recipe:

| | Parts by weight |
|---|---|
| Copolymer | 100 |
| Carbon black | 30 |
| 2,2'-methylene bis(6-tert-butyl-p-cresol) | 0.5 |
| Magnesium oxide | 2 |
| Zinc oxide | 5 |
| 2-mercaptoimidazoline | 0.5 |

A 1 x 5 x 0.033 inch slab was prepared from the mixture and cured for 2 hours at 150° C. (to give a high modulus elastomer).

(b) A second portion of the copolymer was compounded on a rubber roll mill according to a standard peroxide-cure recipe:

| | Parts by weight |
|---|---|
| Copolymer | 100 |
| HAF black | 50 |
| Magnesium oxide | 2 |
| Zinc oxide | 5 |
| Sulphur | 0.2 |
| Dicumyl peroxide [1] | 10 |

[1] 40% active ingredient.

A 1 x 5 x 0.033-inch slab was cured at 153° C. for 45 minutes. A quarter-inch strip of the cured stock was tested on the Instron to give the following data measured at 25° C.:

$T_B$ _____ lb./sq. in__ 2,900
$E_B$ _____ percent 240
$M_{200}$ _____ lb./sq. in__ 2,360
$M_{100}$ _____ lb./sq. in__ 850

(c) Both vulcanizates of (a) and (b) were tested for oil resistance by immersing portions of them in hydrocarbon solvents at room temperature and measuring their increase in volume. The results are tabulated:

| Vulcanizate | Percent increase in volume in— | | |
|---|---|---|---|
| | Heptane | Cyclohexane | Toluene |
| Metal oxide | 76 | 112 | 137 |
| Peroxide | 84 | 141 | 205 |

In these solvents natural rubber, SBR rubber, and butyl rubber will exhibit swelling in the range of 300% or above.

*Example 5*

PREPARATION OF ETHYLENE/1,4-HEXADIENE/5-BROMO-1-PENTENE

The general procedure and equipment described in Example 1 were employed except as noted.

Diisobutylaluminum chloride (0.36 gram, 0.00204 mole) was introduced into a solution of 5-bromo-1-penthene (30 milliliters) and vanadium tris(acetylacetonate) (0.11 gram, 0.000316 mole) in methylene chloride (100 milliliters) at 0° C. under a nitrogen atmosphere. Thereafter 1,4-hexadiene (2 milliliters) was added. Finally, a feed stream supplying ethylene (0.5 liter/minute) and nitrogen (0.5 liter/minute) was introduced above the surface of the methylene chloride solution. After the reaction had been carried out for 60 minutes at a temperature between 0 and 5° C., isopropanol (10 milliliters) was introduced to deactivate the catalyst and stop the polymerization. Then 7 grams of copolymer were precipitated by addition of more isopropanol (200 milliliters). The precipitate was collected by conventional filtration, washed with acetone in a Waring Blendor, and air dried.

This ethylene/1,4-hexadiene/5-bromo-1-pentene copolymer exhibited an infrared absorption band at 10.3 microns (indicative of the incorporation of diene monomer units in the copolymer), had an inherent viscosity (0.1% by weight tetrachloroethylene solution at 30° C.) of 0.82, and contained 25.3% bromine by weight (indicating 42.8% by weight 5-bromo-1-pentene monomer units).

The copolymer was compounded on a rubber roll mill with a standard sulphur recipe:

| | Parts by weight |
|---|---|
| Copolymer | 100 |
| HAF black | 50 |
| Zinc oxide | 5 |
| Stearic acid | 1 |
| Tetramethyl thiuram disulfide | 0.75 |
| Tellurium diethyl dithiocarbamate | 1.50 |
| Sulphur | 0.6 |
| Primol "D" white mineral oil | 20 | and a slab of the mixture obtained was cured for 1 hour at 150° C. Williams rings prepared from it exhibited the following stress-strain properties at 25° C.

Williams ring vulcanizate properties:

$M_{100}$ _____ lb./sq. in__ 800
$M_{200}$ _____ lb./sq. in__ 1,500
$T_B$ _____ lb./sq. in__ 2,000
$E_B$ _____ percent 260

This sulfur cured vulcanizate was tested for oil resistance as described in Example 4 with the results as follows:

Percent volume increase in—
  Heptane _____ 62
  Cyclohexane _____ 84
  Toluene _____ 95

*Example 6*

PREPARATION OF ETHYLENE/5-BROMO-1-PENTENE COPOLYMER

The procedure and equipment described in Example 1 were used except as noted.

Diisobutyl aluminum chloride (0.468 gram, 0.00265 mole) was introduced into a reaction flask containing a solution at 0° C. of vanadium tris(acetylacetonate) (0.14 gram, 0.0004 mole) and of 5-bromo-1-pentene (60 milliliters) in methylene chloride (140 milliliters). Then a feed stream was introduced above the surface of the solution supplying ethylene and nitrogen at respective rates of 0.5 liter/minute and 0.5 liter/minute. After 3 hours isopropanol (10 milliliters) was introduced to deactivate the catalyst and stop the reaction. The ethylene/5-bromo-1-pentene copolymer, precipitated by introduction of more isopropanol (300 milliliters), collected by conventional filtration, and washed and dried according to the procedure of Example 1 above, weighed 15 grams and was a very tough elastomer exhibiting an inherent viscosity of 1.38 (0.1% by weight tetrachloroethylene solution at 30° C.) and containing 30.2, 30.5% bromine by weight indicating a 5-bromo-1-pentene monomer unit content of 56.4% by weight (19.5 mole percent).

*Example 7*

PREPARATION OF ETHYLENE/4-CHLORO-1-BUTENE COPOLYMER

The apparatus and general procedure described in Example 1 were employed except as noted.

Diisobutyl aluminum chloride (0.585 gram, 0.0033 mole) was added to a solution of vanadium tris(acetylacetonate) (0.18 gram, 0.00049 mole) and 4-chloro-1-butene (10 milliliters) in methylene chloride (90 milliliters) at about 3° C. No color change was observed until another portion of diisobutyl aluminum chloride (0.585 gram) was added; then an orange-red color appeared. A gas feed stream supplying 0.5 liter/minute of ethylene and about 0.5 liter/minute of nitrogen was introduced above the solution. Thereafter the reaction mixture was kept at a temperature between 0 and 5° C.

while slow stirring was maintained. The color gradually changed to a dirty greenish-gray and insoluble fine particles appeared. After 90 minutes, isopropanol (100 milliliters) was added and the insoluble copolymer was collected by conventional filtration, washed in a Waring Blendor with acetone and air dried. The elastic ethylene/4-chloro-1-butene copolymer product weighed 5.2 grams and exhibited an inherent viscosity of 0.48 (0.1% by weight tetrachloroethylene solution at 30° C.). It contained 17.4% chlorine by weight indicating 14.3 mole percent of 4-chloro-1-butene monomer units in the copolymer.

*Example 8*

PREPARATION OF ETHYLENE/4-CHLORO-1-BUTENE COPOLYMER

The procedure and equipment described in Example 1 were used except as described below.

Diisobutyl aluminum chloride (1.17 gram, 0.0066 mole) and vanadium tris(acetylacetonate) (0.18 gram, 0.00516 mole) were introduced into methylene chloride (90 milliliters) at 25° C. Afterward, 4-chloro-1-butene (8 grams) and a feed stream supplying ethylene (0.5 liter/minute) were introduced. The solution was stirred at about 25° C. for 1 hour during which time ethylene was continually introduced at the above-described rate. The reaction mixture gradually became turbid and viscous. No rapid temperature rise occurred. While the mixture was allowed to stand at room temperature, it became violent and about half of it was ejected from the reaction vessel. The remainder was diluted with 100 milliliters of isopropanol. Solid polymer precipitated and was collected by conventional filtration, washed with acetone, and air dried. The soft sticky product exhibited an inherent viscosity of 0.19 (0.1% by weight tetrachloroethylene solution at 30° C.), was 87% soluble (in tetrachloroethylene), and contained 20.4% chlorine by weight, indicating 52 weight percent 4-chloro-1-butene monomer units.

*Example 9*

PREPARATION OF ETHYLENE/11-CHLORO-1-HENDECENE COPOLYMER

The general equipment and procedures described in Example 1 were employed except as noted below.

Hendecenyl chloride (21 milliliters) was introduced into methylene chloride (80 milliliters) at 0–5° C. A feed stream supplying a mixture of ethylene (0.5 liter/minute) and nitrogen (0.5 liter/minute) was then introduced over the surface of the methylene chloride contained within the reactor. To this mixture was then added diisobutyl aluminum chloride (0.585 gram, 0.0033 mole) and vanadium tris(acetylacetonate) (0.17 gram, 0.00049 mole). During the following 60 minutes the mixture was stirred at a temperature of 0–5° C. while the ethylene and nitrogen feed stream was supplied at the above-described rates. At the end of this period a very viscous mass had resulted. About 160 milliliters of isopropanol was then added to deactivate the catalyst and to precipitate the copolymer product. Nineteen grams of ethylene/11-chloro-1-hendecene copolymer were obtained exhibiting an inherent viscosity of 1.18 (0.1% by weight tetrachloroethylene solution at 30° C.) and analyzing for 13.1% chlorine by weight (indicating incorporation of 69.5% by weight 11-chloro-1-hendecene monomer units.)

After this copolymer had been compounded according to the recipe given in Example 1, it was heated for 45 minutes at 153° C. in a 1 x 5″ mold. The vulcanizate obtained displayed the following stress-strain properties at 25° C.: $M_{200}$, 600 (p.s.i.); $M_{300}$, 1090 (p.s.i.); $T_B$, 1520 (p.s.i.); $E_B$, 400 (percent).

*Example 10*

A. PREPARATION OF 5,6-DIBROMO-1-HEXENE

A solution of bromine (26.7 cc., 0.5 mole) in carbon tetrachloride (200 cc.) was added dropwise over a 4-hour period to a well-stirred solution of biallyl (119.8 cc., 82 grams, 1.0 mole) in carbon tetrachloride at −5 to −10° C. in a 500-cc. round-bottom glass reaction flask. Thereafter the carbon tetrachloride was distilled off at atmospheric pressure. The residue was fractionally distilled. Two cuts having a refractive index of 1.5200 (25° C.) were combined: *Fraction 2* (67–78° C. at 9.3 mm. Hg; 48 grams) *Fraction 3* (78–80° C. at 9.3 mm. Hg; 36.2 grams). They were again fractionally distilled and the cut boiling at 73° C. (6.5 mm. Hg) was used for the copolymerization described in Part B which follows. The 5,6-dibromo-1-hexene had a refractive index of 1.5197 (25.8° C.).

*Anal.*—Calcd. for $C_6H_{10}Br_2$; Br, 66.05%. Found: Br, 66.3%.

B. PREPARATION OF ETHYLENE/5,6-DIBROMO-1-HEXENE COPOLYMER

The equipment described in Example 1 was used.

Vanadium tris(acetylacetonate) (0.35 gram, 0.001 mole) and dissobutyl aluminum chloride (1.32 gram, 0.0075 mole) were added to methylene chloride (200 milliliters) at 0° C. under a nitrogen sweep. Immediately thereafter 5,6-dibromo-1-hexene (48.8 grams, 0.2 mole) was introduced and a gas feed stream was started supplying a mixture of ethylene (0.5 liter/minute) and nitrogen (1.0 liter/minute). After 30 minutes, reaction time at 0° C., the catalyst was deactivated by addition of methanol (5 milliliters). The completely soluble ethylene/5.6-dibromo-1-hexene copolymer was precipitated with acetone (200 milliliters), air dried, and mill dried to give a yield of 22.9 grams of a very tough rubber exhibiting an inherent viscosity (0.1% by weight solution in tetrachloroethylene at 30° C.) of 0.62 and analyzing for 48.6% by weight bromine (indicating the presence of 73.5% 5,6-dibromo-1-hexene monomer units by weight).

After this copolymer had been compounded according to the following recipe (parts are by weight): Copolymer, 100; MgO 15; medium thermal black, 20; hexamethylene-diamine carbamate, 1, it was heated for 30 minutes at 150° C. in a 1 x 5″ mold. The vulcanizate obtained exhibited the following stress-strain properties at 25° C.: $M_{300}$, 330 (p.s.i.); $T_B$, 812 (p.s.i.); $E_B$, 600 (percent).

C. PREPARATION OF ETHYLENE/5,6-DIBROMO-1-HEXENE COPOLYMER

The procedure of Part B above was repeated except that the ethylene-nitrogen flow rates were doubled and the reaction time was shortened to 20 minutes. The yield of ethylene/5,6-dibromo-1-hexene copolymer was 26.8 grams; it analyzed for 40.0% bromine by weight (indicating the presence of 60.5% 5,6-dibromo-1-hexene monomer units by weight).

*Example 11*

PREPARATION OF ETHYLENE/11-IODO-1-HENDECENE COPOLYMER

The apparatus used is described in Example 1.

Vanadium tris(acetylacetonate) (0.17 gram, 0.00049 mole) and dissobutyl aluminum chloride (0.585 gram, 0.0033 mole) were added to nitrogen-swept methylene chloride (80 milliliters) at 0° C. containing 11-iodo-1-hendecene (28 grams, 0.1 mole). Immediately afterward a gas feed stream was introduced supplying a mixture of ethylene (0.5 liter/minute) and nitrogen (0.5 liter/minute). After 60 minutes' reaction time at 0–5° C., the catalyst was deactivated and the copolymer was precipitated by addition of methanol (80 milliliters). The ethylene/11-iodo-1-hendecene copolymer (30 grams) obtained after acetone washing and drying was an elastomer displaying an inherent viscosity of 0.36 (0.1% solution by weight in tetrachloroethylene at 30° C.) and analyzing for 35% iodine by weight.

After this copolymer had been compounded according to the recipe given in Example 1, it was heated for 45 minutes at 153° C. in a 1 x 5" mold. The vulcanizate obtained exhibited the following stress-strain properties at 25° C.: $M_{200}$, 560 (p.s.i.); $T_B$, 730 (p.s.i.); $E_B$, 240 (percent).

Example 12

PREPARATION OF ETHYLENE/5,6-DICHLOROMETHYL-2-NORBORNENE COPOLYMER

The reactor described in Example 1 was used. Each gas was purified separately by passage, in turn, through a column of silica gel, four columns each containing 30% solutions of aluminum triisobutyl in "Nujol," and a final column of silica gel. The gas feed stream was admitted above the liquid level in the reactor.

Methylene chloride (100 milliliters) was filtered through a column of silica gel directly into the reaction flask and thereafter cooled to 0° C. while being rapidly stirred and sparged with purified nitrogen for about 30 minutes. Vanadium tris(acetylacetonate) (0.175 gram, 0.0005 mole) and diisobutyl aluminum chloride (0.648 gram, 0.00375 mole) were added. Immediately thereafter 5,6-dichloromethyl-2-norbornene (9.55 grams in a 0.5 molar methylene chloride solution) was introduced and a gas feed stream was started supplying a mixture of ethylene (1 liter/minute) and nitrogen 1(liter/minute). After the copolymerization had taken place for 10 minutes at 0° C., the catalyst was deactivated by addition of methanol (5 milliliters). The copolymer was precipitated with acetone (200 milliliters) and vacuum dried at 60° C. The non-elastomeric ethylene/5,6-dichloromethyl-2-norbornene copolymer (6.3 grams) obtained exhibited an inherent viscosity of 0.58 (0.1% by weight solution in tetrachloroethylene at 30° C.) and analyzed for 14.9% chlorine by weight (indicating 9 mole percent chlorine or 4.5 mole percent norbornene monomer units present in the copolymer). The copolymer was self-extinguishing when put into a flame and removed.

Example 13

A. PREPARATION OF 4,5-DIBROMOHEXENE-1

A solution of bromine (26.7 milliliters, 0.5 mole) in carbon tetrachloride (200 milliliters) was added dropwise over a 3.5-hour period into an agitated solution of 1,4-hexadiene (82 grams, 1 mole) in carbon tetrachloride (200 milliliters) at −10 to 0° C. After the excess 1,4-hexadiene and the carbon tetrachloride had been distilled off, the residue was fractionally distilled. The fraction (107 grams) collected at 57–62° C. (5.2 mm. of Hg) was redistilled to give 4,5-dibromohexene-1 (104 grams) boiling at 65–66° C. (6.9 mm. of Hg) and exhibiting a refractive index at 25° C. of 1.5194.

B. PREPARATION OF ETHYLENE/4,5-DIBROMO-HEXENE-1-COPOLYMER

The general procedure of Example 12 was followed except as noted hereafter.

4,5-dibromohexene-1 (24.4 grams, 0.1 mole) was added to methylene chloride (200 milliliters). After vanadium tris(acetylacetonate) (0.35 gram, 0.001 mole) and diisobutyl aluminum chloride (1.44 milliliters, 0.0075 mole) had been introduced, ethylene (0.5 liter/minute) and nitrogen (1.0 liter/minute) were supplied; 75 minutes later the ethylene feed rate was increased to 1.0 liter/minute. After a total reaction time of 105 minutes, the catalyst was deactivated and the copolymer was precipitated, collected, and vacuum dried. The ethylene/4,5-dibromohexene-1 copolymer obtained (12.5 grams) was a very tough, hard, rubbery substance containing 35.6% by weight of bromine (indicating 53.9% 4,5-dibromohexene-1 monomer units present in the copolymer by weight).

Example 14

PREPARATION OF ETHYLENE/5,6-DIBROMOHEXENE-1 COPOLYMER IN HEPTANE

The general procedure of Example 1 was followed except as noted.

Vanadium tris(acetylacetonate) (0.07 gram, 0.0002 mole) and diisobutyl aluminum chloride (0.27 gram, 0.00152 mole) were added to a well-stirred solution of 5,6-dibromohexene-1 (12.4 grams, 0.051 mole) in heptane (42 milliliters) at 0° C. Thereafter for 30 minutes a feed stream was introduced supplying ethylene (0.5 liter/minute) diluted with nitrogen (0.5 liter/minute). The temperature was kept at 0° C. The copolymer formed was insoluble. Finally the catalyst was deactivated with methanol (5 milliliters), and acetone (100 milliliters) was added. After the ethylene/5,6-dibromohexane-1 copolymer had been collected by filtration, washed with acetone, and dried, it weighed 2.8 grams and analyzed for 26.2% bromine by weight (indicating 39.6% 5,6-dibromohexene-1 monomer units present in the copolymer by weight).

Example 15

PREPARATION OF ETHYLENE/5,6-DIBROMOHEXENE-1 COPOLYMER IN CARBON TETRACHLORIDE WITH $VOCl_3/V(ACETYLACETONATE)_3/(ISOBU)_3Al$ CATALYST

The procedure of Example 1 was followed except as noted.

Vanadium oxytrichloride (0.87 gram, 0.005 mole), and vanadium tris(acetylacetonate) (0.07 gram, 0.0002 mole) were added, in turn, to a well-stirred solution of 5,6-dibromohexene-1 (12.4 grams, 0.051 mole) in carbon tetrachloride (42 milliliters) at 0° C. A dark precipitate formed which remained when triisobutyl aluminum (0.42 gram, 0.00212 mole) was subsequently introduced. A feed stream was immediately supplied providing ethylene (0.5 liter/minute) diluted with nitrogen (0.5 liter/minute). During the following 30 minutes, the reaction mixture gradually became very thick. The catalyst was then deactivated with alcohol and the copolymer precipitated with acetone and dried. The yield of ethylene/5,6-dibromohexene-1 was 4.8 grams; its bromine content by weight was 30.5% (indicating 46.1% 5,6-dibromohexene-1 monomer units present by weight).

Example 16

PREPARATION OF ETHYLENE/6 - CHLOROHEXENE-1 COPOLYMER IN CARBON TETRACHLORIDE WITH $VOCl_3/(ISOBU)_3/Al$ CATALYST

The general procedure of Example 15 was followed except as noted.

Vanadium oxytrichloride (0.0043 gram, 0.000025 mole) and triisobutyl aluminum (0.24 gram, 0.00121 mole) were added to a well-stirred solution of 6-chlorohexene-1 (12 milliliters) in carbon tetrachloride (38 milliliters) at 0° C. The ethylene/6-chlorohexene-1 copolymer obtained weighed 0.8 gram. It exhibited an inherent viscosity of 1.52 (0.1% solution by weight at 30° C. in tetracholorethylene-based on 27% solubles) and contained 9.1% chlorine by weight (indicating 9.3 mole % 6-chlorohexene-1 monomer units present).

Example 17

PREPARATION OF ETHYLENE/6-CHLORO-1-HEXENE COPOLYMER

The general procedure of Example 1 was followed except as noted.

Vanadium tris(acetylacetonate) (0.07 gram, 0.0002 mole) and diisobutyl aluminum chloride (0.27 gram, 0.00152 mole) were added to a well-stirred solution of 6-chloro-1-hexene (12 milliliters) in methylene chloride (38 milliliters) at 0° C. Thereafter for 30 minutes a feed stream was introduced supplying ethylene (0.5 liter/minute) diluted with nitrogen (0.5 liter/minute). The temperature was kept at 0° C. Finally, isopropanol (100 milliliters) was introduced. After the ethylene/6-chloro-1-hexene copolymer had been collected by filtration, washed with acetone, and dried, it amounted to a yield of 9.6 grams exhibiting an inherent viscosity (0.1% by weight solution in tetrachloroethylene at 30° C.) of 0.83 and analyzing for 17.3% chlorine by weight (indicating 57.4 weight % or 24.2 mole % 6-chloro-1-hexene monomer units present in the copolymer).

*Example 18*

PREPARATION OF ETHYLENE/PROPYLENE/5-IODO-1-HEXENE COPOLYMER

A. The apparatus used is described in Example 1.

Vanadium tris(acetylacetonate) (0.07 gram, 0.0002 mole) and diisobutyl aluminum chloride (0.26 cc.) were added, in turn, to agitated nitrogen-swept tetrachloroethylene (200 milliliters) at 0° C. containing 5-iodo-1-hexene (3.36 grams, 0.016 mole). Immediately afterward the nitrogen sweep was stopped and a gas feed stream was introduced below the liquid surface supplying a mixture of ethylene (0.75 liter/min.) and propylene (2.25 liters/min.). After 30 minutes more vanadium tris(acetylacetonate) (0.07 gram) and diisobutyl aluminum chloride (0.26 cc.) were added. After 50 minutes, total reaction time at 0° C., the catalyst was deactivated by addition of alcohol and the monomer gas stream was shut off. After the reaction solution had been washed twice with 5% hydrochloric acid and twice with water in a Waring Blendor, the solvent was evaporated to yield 9.7 grams of ethylene/propylene/5-iodo-1-hexene copolymer exhibiting an inherent viscosity (0.1% solution by weight at 30° C. in tetrachloroethylene) of 2.11 and analyzing (by weight) for 47.65% ethylene monomer units, 48.3% propylene monomer units, and, 4.05% 5-iodo-1-hexene monomer units (0.19 moles/kg. copolymer) (iodine content 2.45% by weight).

B. (1) The procedure of Part A above was repeated except that methylene chloride was substituted for tetrachloroethylene. The copolymer formed as a slurry which was collected by filtration, washed twice in a Waring Blendor with acetone, and dried in a vacuum oven at 50° C. The product weighed 23.2 grams, exhibited an inherent viscosity (measured as in A) of 2.16, contained 2.1% by weight iodine, and analyzed (by weight) for 36.3% ethylene monomer units, 59.8% propylene monomer units, and, 3.5% 5-iodo-1-hexene monomer units (0.165 mole/kg. copolymer).

(2) The copolymer made in B(1) was compounded on a rubber roll mill according to the following recipe:

|  | Parts by weight |
| --- | --- |
| Copolymer | 100 |
| MgO | 15 |
| Medium thermal black | 20 |
| Hexamethylenediamine carbamate | 2 |

A rubbery vulcanizate was obtained by heating the stock for 30 minutes at 150° C. followed by an after cure for 5.5 hours at 195° C.

*Example 19*

PREPARATION OF BROMINATED ETHYLENE/1,4-HEXADIENE COPOLYMER

The apparatus used is described in Example 1.

Vanadium oxytrichloridee (0.192 cc.) and triisobutyl aluminum (1.23 cc.) were added to agitated nitrogen swept carbon tetrachloride (200 cc.) at 0° C. containing 1,4-hexadiene (22 cc.). Immediately afterward the nitrogen sweep was shut off and afterward a gas feed stream was introduced supplying a mixture of ethylene (0.25 liter/min.) and nitrogen (1.0 liter/min.). After 2 hours, reaction time at 0° C., the catalyst was deactivated by addition of alcohol. After 20 cc. of the thick solution had been removed, the remainder was brominated by drop-wise introduction of a bromine solution (10 cc. bromine in 25 cc. carbon tetrachloride) until a persistent red bromine color was obtained. A small amount of aqueous sodium bisulfite was added to destroy the excess bromine. Finally, sufficient alcohol was added to precipitate the brominated copolymer. After it had been collected by filtration and dried, it weighed 7.5 grams., exhibited an inherent viscosity of 0.47 (0.1% by weight solution in tetrachloroethylene), and analyzed for 31.0% bromine by weight. The unbrominated copolymer exhibited an inherent viscosity (0.1% by weight solution in tetrachloroethylene at 30° C.) of 0.49.

*Example 20*

PREPARATION OF ETHYLENE/4,4,4-TRIFLUORO-1-BUTENE COPOLYMER

The apparatus used was similar to that described in Example 1 except that the reactor had a capacity of 250 milliliters and was fitted with a Dry Ice condenser.

4,4,4-trifluoro-1-butene (22 grams) was condensed in the nitrogen swept reactor containing a well-stirred solution of vanadium trisacetylacetonate (0.07 gram) in methylene chloride (50 milliliters) at 0° C. After diisobutyl aluminum chloride (0.3 milliliter) had been added, the nitrogen stream was shut off and a gaseous feed stream was immediately introduced supplying a mixture of ethylene (0.5 liter/min.) and nitrogen (0.5 liter/min.). After 30 minutes, reaction time at 0° C., the catalyst was deactivated by addition of about 3 milliliters of alcohol. The reaction mixture slurry was poured into an equal volume of alcohol; the copolymer, collected by filtration and washed with acetone, was dried in a vacuum oven at 50° C. The ethylene/4,4,4-trifluoro-1-butene copolymer was a powdery solid weighing 1.9 grams containing 2.5% fluorine by weight.

*Example 21*

PREPARATION OF ETHYLENE/5-BROMO - 1 - PENTENE COPOLYMER USING TRIISOBUTYL ALUMINUM/TiCl$_4$ CATALYST

The apparatus used is described in Example 1.

Titanium tetrachloride (0.2 milliliter) and triisobutyl aluminum (1.5 milliliter) were added, in turn, to agitated nitrogen swept cyclohexane (200 milliliters) at 25° C. After 5-bromo-1-pentene (20 milliliters) had been introduced into the preformed catalyst solution, the nitrogen sweep was immediately shut off and a gas feed stream was passed above the liquid surface supplying a mixture of ethylene (0.5 liter/min.) and nitrogen (0.5 liter/min.). After 30 minutes' reaction time, the catalyst was deactivated by addition of 5 milliliters of isopropanol and the monomer feed stream washshut off. The insoluble ethylene/5-bromo-1-pentene copolymer was collected by filtration, washed with acetone in a Waring Blendor, and air-dried. It was a powder exhibiting an inherent viscosity (0.1% by weight solution in tetrachloroethylene at 30° C.) of 0.54 and analyzing for 13.4% bromine (by weight).

It is understood that the preceding examples are representative and that said examples may be varied within the scope of the total specification, as understood by one skilled in the art, to produce essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A normally solid, curable copolymer of (1) ethylene; and (2) at least one halogenated olefin selected from the group consisting of: (a) compounds having the structure $CH_2=CH-CH_2-R$ where R is a monovalent aliphatic hydrocarbon radical having from about 1 to 12 carbon atoms, said radical being substituted by at least one halogen atom; and (b) 2-norbornenes substituted in at least one of the 5- and the 6-positions with halogen-bearing hydrocarbon radicals having no more than 5 carbon atoms, the double bond at the 2-position being unsubstituted; said copolymers containing at least 2% by weight of side-chain substituted halogen, based on the weight of copolymer.

2. A copolymer as defined in claim 1 wherein the halogenated olefin has the structure $CH_2=CH-CH_2-R$ and the halogen-substituted monovalent aliphatic hydrocarbon radical R is selected from the group consisting of $-(CH_2)_nX$ and $-(CH_2)_n-CHX-CHX-R'$ wherein $n$ is an integer of from 1 to 12, X is halogen and R' is selected from the group consisting of hydrogen and methyl radical.

3. A copolymer as defined in claim 2 wherein the halogen-bearing 2-norbornene is 5,6-bischloromethyl-2-norbornene.

4. A normally solid, curable copolymer of (1) ethylene; (2) at least one halogenated olefin selected from the group consisting of: (a) compounds having the structure $CH_2=CH-CH_2-R$ where R is a monovalent aliphatic hydrocarbon radical having from about 1 to 12 carbon atoms, said radical being substituted by at least one halogen atom; and (b) 2-norbornenes substituted in at least one of the 5- and the 6-positions with halogen-bearing hydrocarbon radicals having no more than 5 carbon atoms, the double bond at the 2-position being unsubstituted; and (3) at least one unsaturated hydrocarbon monomer, other than ethylene, selected from the group consisting of (a) α-monoolefins having the formula $CH_2=CH-R''$ wherein R'' is an alkyl radical of from about 1 to 8 carbon atoms, and (b) non-conjugated hydrocarbon dienes of from about 6 to 22 carbon atoms; said copolymer containing at least 2% by weight of side-chain substituted halogen, based on the weight of copolymer.

5. A copolymer as defined in claim 4 wherein said non-conjugated hydrocarbon diene is 1,4-hexadiene.

6. A copolymer as defined in claim 4 wherein said α-monoolefin is propylene.

7. A copolymer as defined in claim 4 wherein the halogenated olefin has the structure $CH_2=CH-CH_2-R$ and the halogen-substituted monovalent aliphatic hydrocarbon radical R is selected from the group consisting of $-(CH_2)_nX$ and $-(CH_2)_n-CHX-CHX-R'$ wherein $n$ is an integer of from 1 to 12, X is halogen and R' is selected from the group consisting of hydrogen and methyl radical.

8. A copolymer as defined in claim 7 wherein the halogen-bearing 2-norbornene is 5,6-bischloromethyl-2-norbornene.

9. A normally solid, curable copolymer containing at least 2% by weight of side-chain substituted halogen based on the weight of copolymer, said copolymer comprising monomer units of (1) ethylene, (2) 4,5-dibromo-1-hexene, and (3) 1,4-hexadiene.

10. A normally solid, curable copolymer containing at least 2% by weight of side-chain substituted halogen based on the weight of copolymer, said copolymer comprising monomer units of (1) ethylene, (2) 5,6-dibromo-1-hexene and (3) 1,4-hexadiene.

11. A normally solid, curable copolymer containing at least 2% by weight of side-chain substituted halogen based on the weight of compolymer, said copolymer comprising monomer units of (1) ethylene, and (2) 5-bromo-1-pentene.

12. A copolymer as defined in claim 9 wherein said 1,4-hexadiene units are present in amounts of at least 0.03 mole per 100 grams of copolymer.

13. A copolymer as defined in claim 10 wherein said 1,4-hexadiene units are present in amounts of at least 0.03 mole per 100 grams of copolymer.

14. A copolymer as defined in claim 1 in the cured state.

15. A copolymer as defined in claim 4 in the cured state.

References Cited by the Examiner

UNITED STATES PATENTS

| | | | |
|---|---|---|---|
| 2,799,668 | 7/1957 | Anderson et al. | 260—88.1 |
| 3,063,973 | 11/1962 | Gladding et al. | 260—80.5 |
| 3,093,620 | 6/1963 | Gladding | 260—80.5 |
| 3,093,621 | 6/1963 | Gladding et al. | 260—80.5 |
| 3,101,327 | 8/1963 | Lyons | 260—94.9 |

FOREIGN PATENTS

| | | |
|---|---|---|
| 578,992 | 7/1946 | Great Britain. |
| 776,326 | 6/1957 | Great Britain. |

OTHER REFERENCES

Chemical and Engineering News, vol. 42, pp. 55, Sept. 14, 1964.

JOSEPH L. SCHOFER, *Primary Examiner.*

H. N. BURSTEIN, WILLIAM H. SHORT, *Examiners.*

UNITED STATES PATENT OFFICE
CERTIFICATE OF CORRECTION

Patent No. 3,222,330                                      December 7, 1965

Jack Leland Nyce et al.

It is hereby certified that error appears in the above numbered patent requiring correction and that the said Letters Patent should read as corrected below.

Column 1, line 44, for "discribed" read -- described --; column 2, lines 48 to 50, the formula should appear as shown below instead of as in the patent:

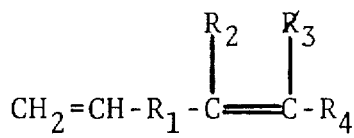

same column 2, line 57, for "bornadiene" read -- bornadienes --; column 3, lines 19, 38 and 73, for "polymeriaztion", each occurrence, read -- polymerization --; line 72, strike out "between", second occurrence; same column 3, line 74, for "Rrepresentative" read -- Representative --; column 4, line 1, for "cyclopentadine" read -- cyclopentadiene --; line 2, for "for" read -- from --; same column 4, line 39, for "alkayl" read -- alkyl --; column 7, line 65, for "coplymers" read -- copolymers --; column 8, line 21, for "hydroperozide" read -- hydroperoxide --; line 23, for ")often" read -- (often --; column 9, line 54, for "0.2" read -- S, 0.2 --; column 11, line 1, for "pounds" read -- pounded --; line 57, for "penthene" read -- pentene --; column 14, line 31, for "5.6-" read -- 5,6- --; column 15, line 29, for "1 (liter" read -- (1 liter --; column 16, line 49, for "(ISOBU)$_3$/Al" read -- (ISOBU)$_3$Al --; column 17, line 65, for "oxytrichloridee" read -- oxytrichloride --; line 72, after "hours" strike out the comma; column 18, line 51, for "washshut" read -- was shut --.

Signed and sealed this 25th day of October 1966.

(SEAL)
Attest:

ERNEST W. SWIDER                                    EDWARD J. BRENNER
Attesting Officer                                    Commissioner of Patents